(No Model.) 2 Sheets—Sheet 2.
A. DICK.
MACHINE FOR SHOCKING GRAIN.
No. 246,095. Patented Aug. 23, 1881.
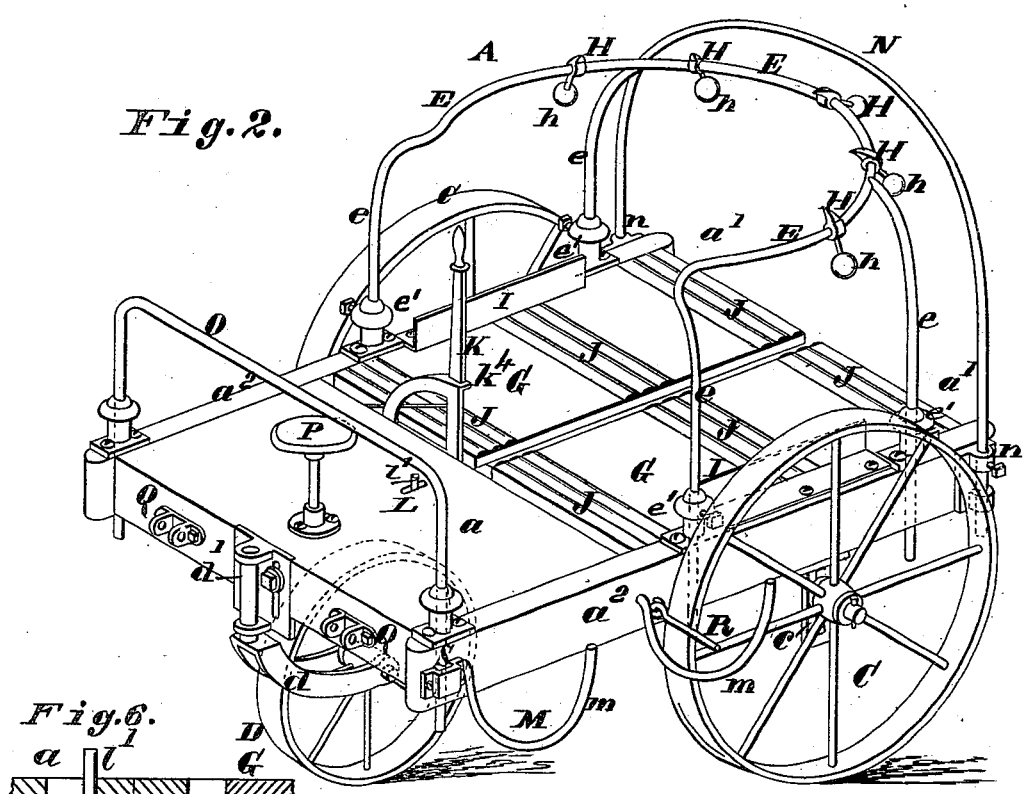
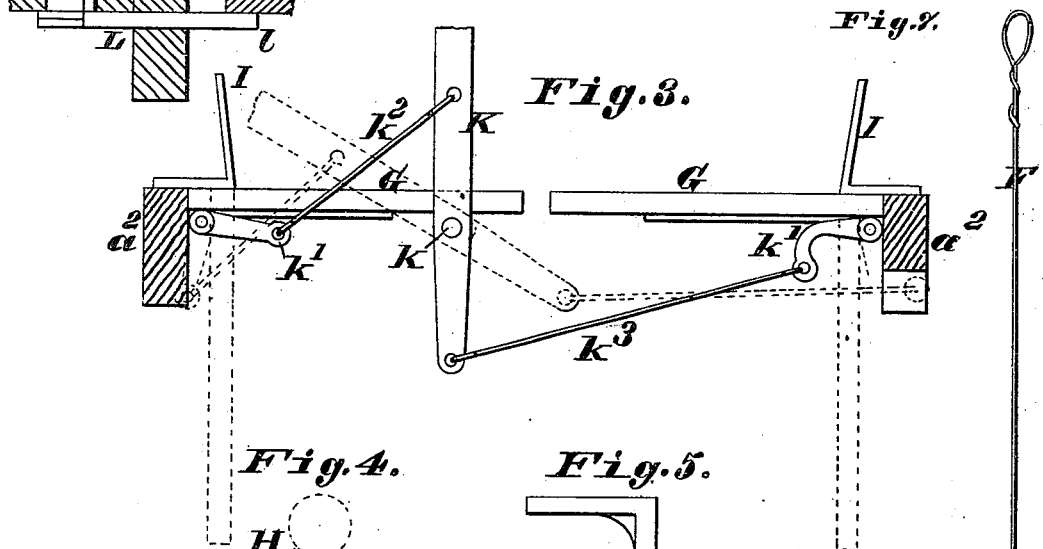
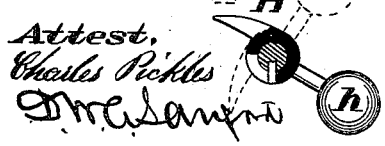
Attest,
Charles Pickles
D. W. C. Sanford
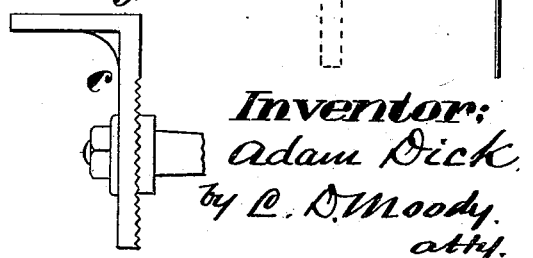
Inventor:
Adam Dick
by L. D. Moody
atty.

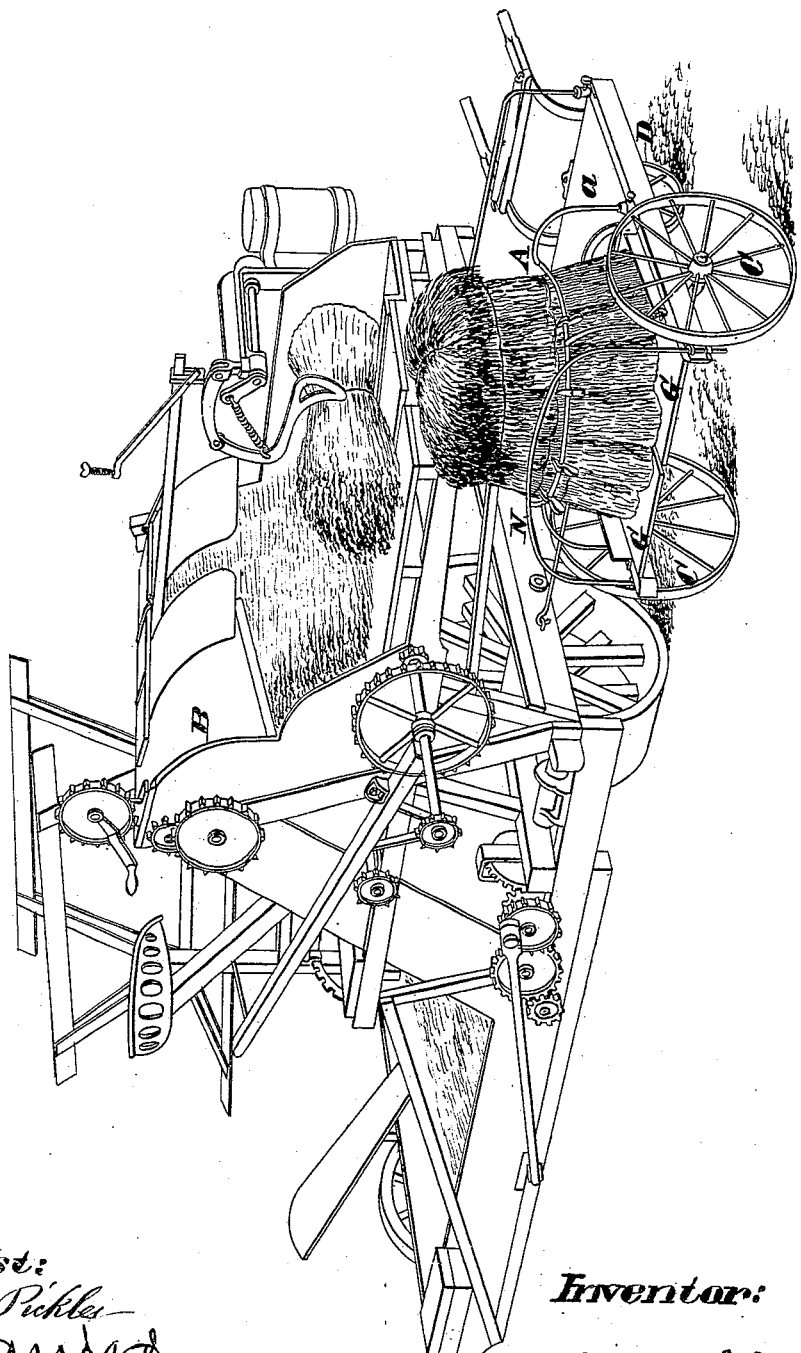

UNITED STATES PATENT OFFICE.

ADAM DICK, OF MOLINE, ILLINOIS.

MACHINE FOR SHOCKING GRAIN.

SPECIFICATION forming part of Letters Patent No. 246,095, dated August 23, 1881.

Application filed April 2, 1881. (No model.)

*To all whom it may concern:*

Be it known that I, ADAM DICK, of Moline, Illinois, have invented a new and useful Machine for Shocking Grain, of which the following is a full, clear, and exact description, reference being had to the annexed drawings, making part of this specification, in which—

Figure 1 is a view in perspective, showing the invention in position alongside a harvester; Fig. 2, a view in perspective of the machine, looking toward the side opposite to that shown in Fig. 1; Fig. 3, a vertical transverse section of the platform; Fig. 4, a cross-section taken through the shock-support, showing one of the spurs thereon; Fig. 5, a detail, being an elevation of one of the bearings of the hind wheels; Fig. 6, a detail, being a view of the slide used in supporting the trap-doors; and Fig. 7, a view of the shock-band.

The same letters denote the same parts.

The present invention is an improvement in that class of machines for shocking grain wherein the sheaves are received from the harvester upon a platform which is attached or that travels with the harvester, and there formed into the shock, which, when formed, is dropped from the platform onto the ground.

Referring to the drawings, A represents the platform or carriage in question. Its relative position to the harvester B is shown in Fig. 1. It is supported upon the hind wheels, C C, and the front wheel, D, the wheels C C being at or toward the sides of the platform, and the wheel D preferably at the center of the forward end of the platform, and in the form of a caster-wheel, the arm $d$ of which is held in the bearing $d'$, and which, as well as the bearings $c\ c$ of the wheels C C, is made vertically adjustable to enable the platform, when supported upon its own wheels, to be adjusted properly to the harvester with which, for the time being, the platform is being used.

The operator stands upon the platform at $a$ and receives the sheaves, and forms them into a shock at or toward the rear end, $a'$, of the platform. The sheaves are placed vertically in forming the shock, the butts resting upon the platform.

To hold the sheaves properly in forming the shock they should be supported laterally meanwhile. This lateral support is accomplished by means of a support which is preferably in the form of a rail, and which, in its general outline, is shaped to conform to the diameter of the intended shock, being extended in a circular direction, saving that toward the front of the platform, where the operator stands, the support is omitted, leaving an opening through which the sheaves are conveniently passed. The rail E is supported by the standards $e\ e$, which are held and made vertically adjustable in the bearings $e'\ e'$, and to enable the support E to be adaptable to grain of different height, being raised in the bearings $e'\ e'$ when tall grain is being harvested and lowered when shorter grain is being worked. The first of the sheaves of the shock are placed to lean against the rear portion of the support E, forming a row along that part of the support, and the remaining sheaves are placed against the first ones, and so on until the complement of sheaves is within the support. A band—say in the form of the wire F, Fig. 7—is then drawn around the sheaves and the cap-sheaf placed on the shock, completing the shock, which is now ready to be discharged from the machine. This is accomplished, preferably, as follows: The portion $a'$ of the platform upon which the shock has been formed is in the form of trap-doors G G, which are constructed and hinged to the frame of the platform at the sides $a^2\ a^2$ thereof, and which are upheld in a level position until the shock is ready to be dropped, when, by means of a suitable device, the doors G G are tripped, whereupon the shock drops directly downward onto the ground beneath the platform. After the machine has cleared the shock the doors G G are raised again and the forming of a second shock is proceeded with, and so on, taking the sheaves as fast as they come from the harvester and forming them at once into a shock, and then dropping the shock to the ground.

As the sheaves are upon the platform and are being bound into a shock, it is desirable to hold them meanwhile securely in an upright position. To this end the sheaves must be kept from slipping sidewise upon the support E, and the butts of the sheaves must not be allowed to slip upon the platform. The first is accomplished, preferably, by means of the spurs H H, which are arranged at suitable intervals upon the rail E, forming a series of any desired number. The first of the sheaves of the shock are stuck onto the spurs, and as the latter cannot slide laterally upon the rail the sheaves are held from moving sidewise upon the rail. The spurs, however, are attached to the rail so as to turn freely thereon in a vertical plane, as indicated by the dotted lines in Fig. 4. Then as the doors are dropped the spurs turn upon the rail and allow the shock to drop to the ground. The spurs are weighted at $h\ h$, causing them, after the shock is discharged, to assume their original positions, as in Fig. 2.

To hold the butts of the sheaves in place upon the platform, guards I I, preferably in the form of flanges, are attached to the platform at the sides $a^2$ thereof, and so as to come slightly within the outer edges of the doors G G. This prevents the sheaves and shock from slipping transversely upon the platfrom, and to prevent them from slipping longitudinally thereon, the platform may be furnished with ribs or corrugations J J, which extend transversely upon the platform, or at right angles to the length of the doors G G, whichever way the latter may be arranged. This holds the lower ends of the sheaves and shock from slipping longitudinally upon the platform, but does not interfere with the descent of the shock when the doors G G are tripped.

The tripping mechanism is preferably as follows: K represents a lever pivoted to the platform at $k$. The doors are provided with arms $k'\ k'$. Rods $k^2\ k^3$ lead from the arms $k'$ to the lever $k$, being jointed at their outer ends to the arms $k'$, and their inner ends being jointed to the lever K, and respectively above and beneath the pivot $k$. The lever K when the doors are raised, is held in a suitable catch, such as at $k^4$, and on releasing the lever therefrom the doors drop down, as indicated by the dotted lines in Fig. 3, the movement being prompted by reason of the arrangement of lever and arms above described.

As it is desirable to prevent the downward strains upon the center of the platform from being sustained entirely by the tripping device, I preferably employ a supplementary device in the form of a slide, L, Figs. 2 and 6, which is arranged in, upon, or beneath the end $a$ of the platform, and to be moved longitudinally so that its end $l$ shall support the doors G G when raised, and to be drawn back from beneath the doors when the latter are to be dropped. To this end the slide is provided with an arm, $l'$, that projects upward, enabling the operator upon the platform to move the slide. The slide not only sustains the doors when pushed out, but also serves to hinder the accidental dropping of the door in case the lever K becomes dislodged from the catch $k^4$.

As it may be occasionally desirable for the operator not to place the sheaves at once into place upon the platform within the support E, the platform at its sides is furnished with a holder, M—say in the form of the arms $m\ m$—into which the sheaves may be laid temporarily until needed by the operator.

N represents a tie-rod, used preferably to connect the rear ends of the platform, and so as to come above the level of the shock when the latter is dropped. To suit grain and shocks of different heights it is made vertically adjustable, as indicated at $n\ n$.

O represents a guard for the protection of the operator. A seat, P, may be used.

Q Q are thill-fastenings when the platform is being drawn by a horse or horses harnessed directly to the platform.

R represents a fastening in the form of a tie-rod, to hold the platform sidewise to the harvester. The rod is jointed to the platform to provide for inequalities of the ground and consequent varying position of the platform with reference to the harvester.

S represents a catch for holding the outer end of a thrust-bar, that may extend from the harvester to the platform, and to move the platform along.

I claim—

1. The platform A, having a support for supporting laterally the sheaves while being formed into a shock, said support being vertically adjustable, for the purpose described.

2. The platform A, having the ribs or corrugations J, for the purpose described.

3. The combination of the platform A, having the trap-doors G G, the support E, and the spurs H H, substantially as described.

4. The doors G G, having the ribs or corrugations J extending transversely thereupon, substantially as described.

5. The combination of the platform A, guards I I, and ribs or corrugations J, substantially as described.

6. The combination of the platform A, having guards I I and ribs or corrugations J, and support E, substantially as described.

7. The combination of the platform A, having guards I I and ribs or corrugations J, support E, and spurs H, substantially as described.

8. The combination of the platform A, having the doors G G, the guards I I, and ribs or corrugations J, support E, and spurs H H, substantially as described.

9. The platform A, in combination with tie N, substantially as described.

10. The combination of the platform A, the doors G G, and the lever K, arms $k'$, and rods $k^2\ k^3$, substantially as described.

11. The combination of the platform A, having doors G G, slide L, lever K, arms $k'$, and rods $k^2\ k^3$, substantially as described.

12. The combination of the platform A and support E, the latter having projections or shoulders to keep the sheaves from slipping sidewise thereon.

ADAM DICK.

Witnesses:
CHAS. D. MOODY,
CHARLES PICKLES.